Patented Nov. 29, 1949

2,489,356

UNITED STATES PATENT OFFICE 2,489,356

BENZOTRIAZINES AND PROCESS FOR PREPARING THE SAME

Frank J. Wolf, Westfield, and Karl Pfister, III, Elizabeth, N. J., assignors to Merck & Co., Inc., Rahway, N. J., a corporation of New Jersey No Drawing. Application January 10, 1947, Serial No. 721,473

6 Claims. (Cl. 260—249.5)

This invention relates to new organic chemical compounds possessing therapeutic activity, and to methods by which they may be prepared from readily available starting materials. More particularly, the invention relates to the preparation of 7-halogen-3-acylamino-benzotriazine-oxide-1 compounds, and to the chemical compounds so produced, which are useful intermediates in the preparation of complex organic compounds including antimalarial agents and dyes.

The new compounds of the present invention are prepared from 7-halogen-3-amino-benzotriazine-1,2,4-oxide-1 compounds, which are obtained by reacting a 4-halogen-2-nitro-aniline with cyanamide, and reacting the resulting guanidine derivative with alkali; as fully described in our pending application Serial No. 661,084, filed April 10, 1946.

In carrying out the process of the present invention, a mixture of a 7-halogen-3-amino-benzotriazine-1,2,4-oxide-1 and a mono- or dibasic carboxylic acid anhydride in a basic organic solvent, such as pyridine, is heated to reflux for an extended period (i. e., about 5 to 20 hours). From the resulting reaction mixture the desired 3-acylamino compound can be recovered by concentrating to dryness, taking up the residue in dilute (about 1 N) alkali, and acidifying, as with hydrochloric acid, to cause separation of the crystalline product. Alternately, the reaction mixture can be cooled to precipitate a first crop of crystalline product and the residual solution then concentrated in vacuo and again cooled to precipitate additional product.

The reactions above described can be expressed by the following diagram:

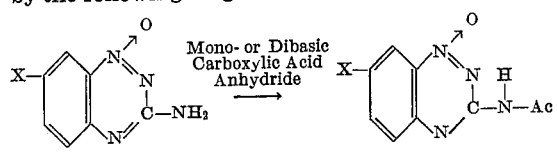

wherein X is halogen; and Ac is an acyl group derived from a carboxylic acid.

The following examples show how the process of the present invention can be carried out, but it is to be understood that these examples are given by way of illustration and not of limitation.

Example 1

A mixture of 9.6 gms. of 7-chloro-3-amino-benzotriazine-1,2,4-oxide-1 and 10 gms. of succinic anhydride in 100 ml. of dry pyridine is refluxed for 16 hours. At the end of this time the solution is concentrated to dryness in vacuo. The residue is taken up in 1N NaOH and filtered. Green platelets of 7-chloro-3-succinyl amino-benzotriazine-1,2,4-oxide-1 form upon acidification of the filtrate with hydrochloric acid; yield, 4 gms.; M. P. 250–251° C.

Example 2

A solution of 19.6 gms. of 7-chloro-3-amino-benzotriazine-1,2,4-oxide-1 in 10.5 ml. of acetic anhydride and 200 ml. of pyridine is refluxed for 8 hours. The solution is cooled and the precipitate of 7-chloro-3-acetylaminobenzotriazine-1,2,4-oxide-1 filtered. A second crop is obtained by concentrating the filtrate in vacuo to a small volume. A total yield of 16.4 gms. is obtained; M. P. 256°, 75% of the theoretical amount.

Modifications can be made in the procedures herein described without departing from the spirit and scope of the present invention, and we are to be limited only by the appended claims.

We claim:

1. A compound of the formula:

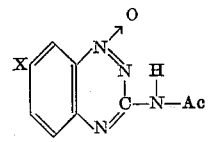

wherein X is halogen and Ac is selected from the class consisting of acetyl and succinyl groups.

2. 7-chloro-benzotriazine-1,2,4-oxide-1 having in the 3-position a substituent

wherein Ac is selected from the class consisting of acetyl and succinyl groups.

3. 7-chloro-3-succinylamino-benzotriazine-1,2,4-oxide-1.

4. 7-chloro-3-acetylamino-benzotriazine-1,2,4-oxide-1.

5. The process that comprises reacting 7-halogen-3-amino-benzotriazine-1,2,4-oxide-1 with a substance of the class consisting of acetic and succinic anhydrides in the presence of a basic organic solvent thereby forming the corresponding 7-halogen-3-acylamino-benzotriazine-1,2,4-oxide-1.

6. The process that comprises heating to reflux for 5 to 20 hours a mixture of 7-halogen-3-amino-benzotriazine-1,2,4-oxide-1, a substance of the class consisting of acetic and succinic anhydrides, and a basic organic solvent, thereby forming the corresponding 7-halogen-3-acylamino-benzotriazine-1,2,4-oxide-1.

FRANK J. WOLF.
KARL PFISTER, III.

REFERENCES CITED

The following references are of record in the file of this patent:

UNITED STATES PATENTS

| Number | Name | Date |
|---|---|---|
| 2,235,480 | Graenacher | Mar. 18, 1941 |

FOREIGN PATENTS

| Number | Country | Date |
|---|---|---|
| 486,577 | Great Britain | 1938 |

OTHER REFERENCES

Ardnt, Berichte 50 (1917), 1248–1261.
Fuson and Shriner, "Identification of Organic Compounds," pp. 193, 194, 146 and 147.